United States Patent [19]
Sienz et al.

[11] Patent Number: 6,118,245
[45] Date of Patent: Sep. 12, 2000

[54] CONTROL DEVICE AND CONTROL PROCESS FOR MOTORS

[75] Inventors: Michael Sienz, Overath; Siegfried Koepp, Mühltal; Dietmar Stoiber, Grünwald, all of Germany

[73] Assignee: Siemens Linear Motor Systems GmbH & Co. KG, München, Germany

[21] Appl. No.: 09/194,757

[22] PCT Filed: Jun. 5, 1997

[86] PCT No.: PCT/EP97/02910

§ 371 Date: Dec. 2, 1998

§ 102(e) Date: Dec. 2, 1998

[87] PCT Pub. No.: WO97/46924

PCT Pub. Date: Dec. 11, 1997

[30] Foreign Application Priority Data

Jun. 5, 1996 [DE] Germany ............... 196 22 699

[51] Int. Cl.$^7$ ............................. G05B 11/00
[52] U.S. Cl. ............. 318/687; 318/135; 318/721; 318/254; 318/138; 318/434
[58] Field of Search ............ 318/687, 135, 318/721, 254, 138, 439

[56] References Cited

U.S. PATENT DOCUMENTS

| | | |
|---|---|---|
| 3,903,463 | 9/1975 | Kanamori . |
| 4,135,120 | 1/1979 | Hoshimi et al. . |
| 5,063,335 | 11/1991 | Baechtel et al. . |
| 5,880,586 | 3/1999 | Dukart et al. ............ 318/687 X |

FOREIGN PATENT DOCUMENTS

| | | |
|---|---|---|
| 0 604 666 | 7/1994 | European Pat. Off. . |
| 0 723 137 | 7/1996 | European Pat. Off. . |
| 21 46 499 B2 | 3/1973 | Germany . |
| 24 14 721 A1 | 10/1975 | Germany . |
| 29 15 873 C2 | 10/1979 | Germany . |
| 41 22 769 C2 | 1/1993 | Germany . |
| 31 48 007 C2 | 6/1993 | Germany . |
| 43 35 371 A1 | 5/1994 | Germany . |
| 196 05 413 | 7/1996 | Germany . |
| 1 142 774 | 2/1969 | United Kingdom . |
| WO 85 05710 | 12/1985 | WIPO . |
| WO 97 12305 | 4/1997 | WIPO . |

OTHER PUBLICATIONS

Patent Abstracts of Japan vol. 015, No. 083 (P–1171), Feb. 26, 1991 & JP 02 297611 A (Fanuc Ltd), Dec. 10, 1990, see abstract.

*Primary Examiner*—Karen Masih
*Attorney, Agent, or Firm*—Henry M. Feiereisen

[57] ABSTRACT

The invention relates to control device and control process for motors. In order to prevent phase distortion and the like in controlled systems, a sensor (250) for detecting the state of movement of a motor (200) is provided directly on or in the force transmission interface (270) of the motor. The sensor can, for example, determine the position, speed or acceleration directly. The invention is particularly suitable for controlling linear motors in high-precision applications, such as machine tools, milling machines or pick-and-place robots.

23 Claims, 3 Drawing Sheets

CONTROL DEVICE AND CONTROL PROCESS FOR MOTORS

BACKGROUND OF THE INVENTION

The invention relates to a control device for a motor of a type having at least two motor parts which interact with each other via a force transmission interface and are movable relative to each other, a sensor for determining the state of movement of the motor parts, and a controller for controlling the state of movement of the motor in response to signals of the sensor. The present invention further relates a process for controlling a motor.

Control devices for operating motors are generally known. For this purpose, for example, a sensor determines the state of movement and/or the position of the motor which is then supplied to a control device that operates the motor depending on the difference between the desired value and the actual value of the motor parameters. In this manner, precise adjustment of time-dependent set parameters, such as position, speed or acceleration can be realized.

Continued technical advancements, however, necessitate a more precise control of, e.g., electromotors, but also of hydraulic motors and combustion engines.

Control devices of modern automatic production machines, in particular automatic bonding machines, pick-and-place robots, milling machines and the like, have to satisfy different and sometimes contradictory requirements.

For example, a pick-and-place robot that places electronic components on printed circuit boards, has to realize a point-to-point movement in which, on one hand, the component must be placed at pinpoint accuracy and, on the other hand, the point-to-point movement has to be executed at a high speed, so that at a consequence of the acceleration and deceleration oscillations are caused in the system which can adversely affect the placement accuracy. This applies also to modern milling machines where a relatively small milling head is used for differently sized milling openings and contours. Precise placement requires here also a high speed and acceleration, respectively, of the milling head.

Translational drives for conventional machine tools, e.g. milling machines, and of pick-and-place robots use ball roller spindle drives in which an electromotor drives a ball roller spindle which then moves a tool platform or a workpiece platform. In this design, the motor is controlled by a rotation sensor located on the motor and also by a linear scale located on the tool platform.

All mechanical components of the ball roller spindle drive, however, have been found to adversely affect the controlled system, i.e. time delays due to the elastic properties of the spindle, the oscillations of the workpiece or of the tool platform, etc., cause phase rotations in the controlled system which can lead to an oscillation problem.

This problem can be partially alleviated by using direct drives, i.e. electromagnetic linear motors, since a linear direct drive eliminates, e.g., the mechanical component of the ball roller spindle. It should be noted, however, that all mechanical elements, e.g. the suspension of the milling head, of the workpiece platform etc., adversely affect the controlled system, although to a lesser extent. Moreover, the operation of the control circuit itself also becomes an important factor. In connection with a speed control, an actual speed signal is typically derived from an actual position signal and compared with a desired speed signal. The differentiation with respect to time introduces a system delay which manifests itself as a phase delay or phase rotation and adversely affects the controlled system. Furthermore, the position data are typically measured as discrete data points, resulting in quantization noise which is amplified during differentiation with respect to time. This situation is even more pronounced when the acceleration is controlled.

The so-called cascade control where several controllers, for example a position control, a speed control and an acceleration control, are connected in series, experiences similar problems.

The accuracy of the control can be improved by using a so-called pilot control wherein, for example, an additional speed pilot control signal which is derived from the desired values, is supplied to the speed controller. However, the above-stated problems associated with phase rotation, phase shift and delay remain.

SUMMARY OF THE INVENTION

It is therefore an object of the invention to provide a control device for a motor for realizing a quick and accurate control of the state of movement of the motor. It is another object of the invention to provide, a corresponding process for controlling a motor.

The object is solved by a control device having a sensor which is associated with the force transmission interface of the motor. In accordance with the present invention, a process for controlling a motor includes the step of registering the state of movement of the motor at the force transmission interface of the motor.

According to the invention, the sensor for measuring the state of movement of the motor is located at the force-transmission point of the motor. All changes in the state of movement of the motor can then be directly measured and supplied to the controller so as to permit a direct control free from mechanical effects and/or effects from the control device, such as differentiation and the like.

The sensor preferably measures directly the state parameters of the force-transmission medium at the force transmission point of the motor, for example the pressure state of a fluid or the electric and/or magnetic field strength of an electromotor, i.e. the field that also effects the force transmission in the motor. This state parameter is a direct measure for the state of movement of the motor and changes in the state of movement of the motor. For this purpose, the sensor is—in a general sense—arranged "inside" the force transmission medium of the motor.

In the case of a rotating motor, the sensor can be an angular position pickup, an angular speed pickup or an angular acceleration pickup; in the case of a linear motor, the sensor can be a displacement pickup, a speed pickup and/or an acceleration pickup.

In the process according to the invention, the state of movement of the motor is determined directly at the force-transmission interface, advantageously via the force transmission medium.

The control process can be advantageously combined with a cascade control which includes a speed and/or acceleration control; it is also possible to employ a speed and/or acceleration pilot control.

BRIEF DESCRIPTION OF THE DRAWING

Exemplified embodiments of the invention will be described with reference to the appended drawings, in which.

DETAILED DESCRIPTION OF PREFERRED EMBODIMENTS

Figure 1:
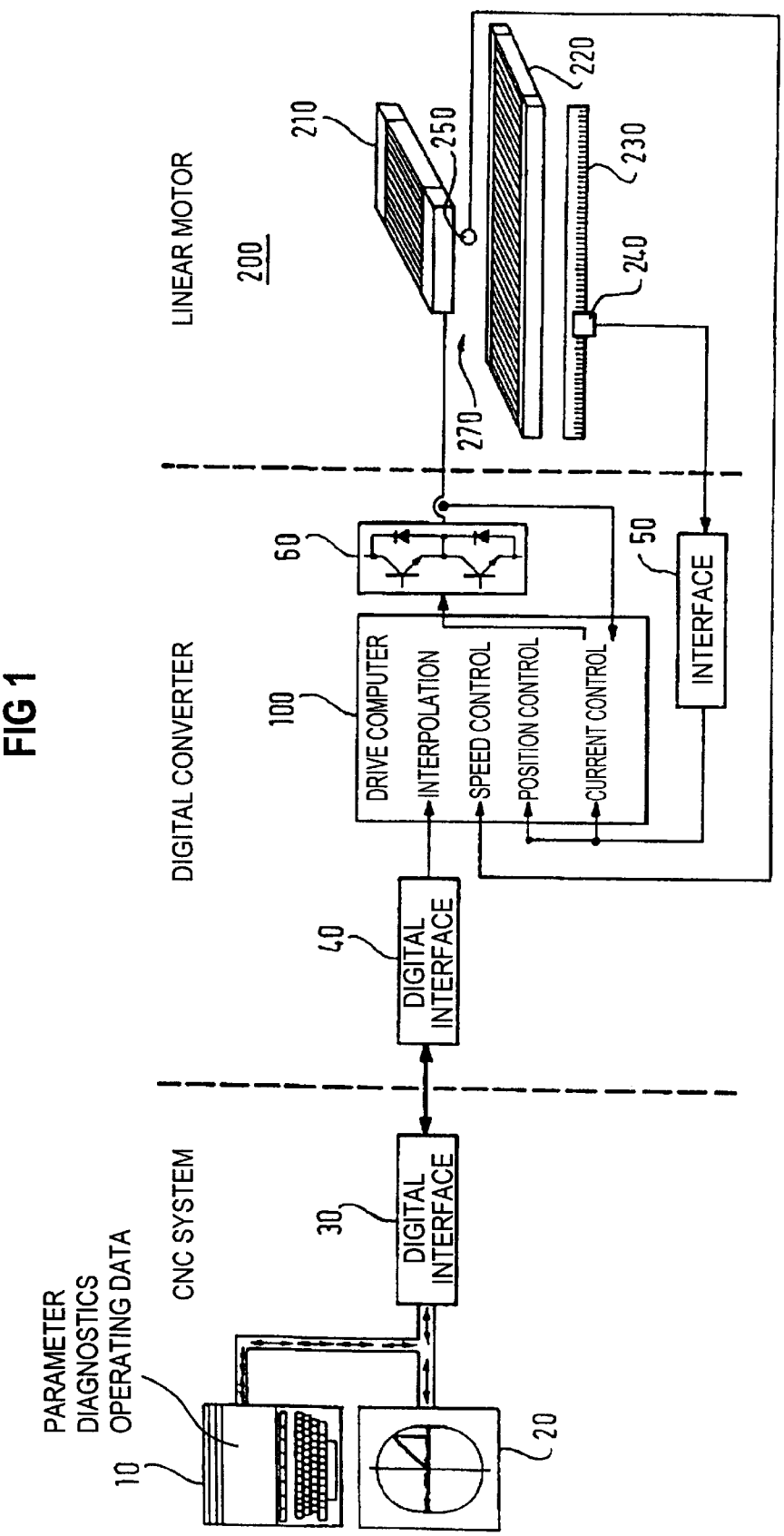
FIG. 1 shows a schematic illustration of a CNC-controlled machine tool with a linear motor.

In FIG. 1, reference numeral 10 denotes a machine computer for controlling the CNC machine. The computer 10 communicates with a data carrier 20 which stores, for example, preset data for controlling a milling head (not shown). The preset data are supplied to a drive computer 100 via an interface 30 and an interface 40. The drive computer controls via an end stage 60 a schematically illustrated linear motor 200.

The linear motor 200 includes in a known manner a primary part (reaction part) 210 and a secondary part (stator) 220. Also illustrated schematically are a linear scale 230 and a displacement pickup 240. A sensor 250 for directly determining the speed, is positioned on or inside the force transmission interface of the linear motor, i.e. in the air gap between their primary and the secondary part. The determination of the speed can be derived, for example, directly from the time dependence of the magnetic field at the sensor location.

The sensors 250 and 240 transmit their signals to the drive computer 100 which realizes a speed control, position control and current control, respectively.

In FIG. 1 the linear scale is shown separate from the linear motor, but may also be located at the site of the force transmission interface, i.e. in the air gap between the motor parts. The linear scale and the displacement sensor, respectively, can also take advantage of the properties of the force transmission medium, i.e. of the electromagnetic field.

Figure 2:
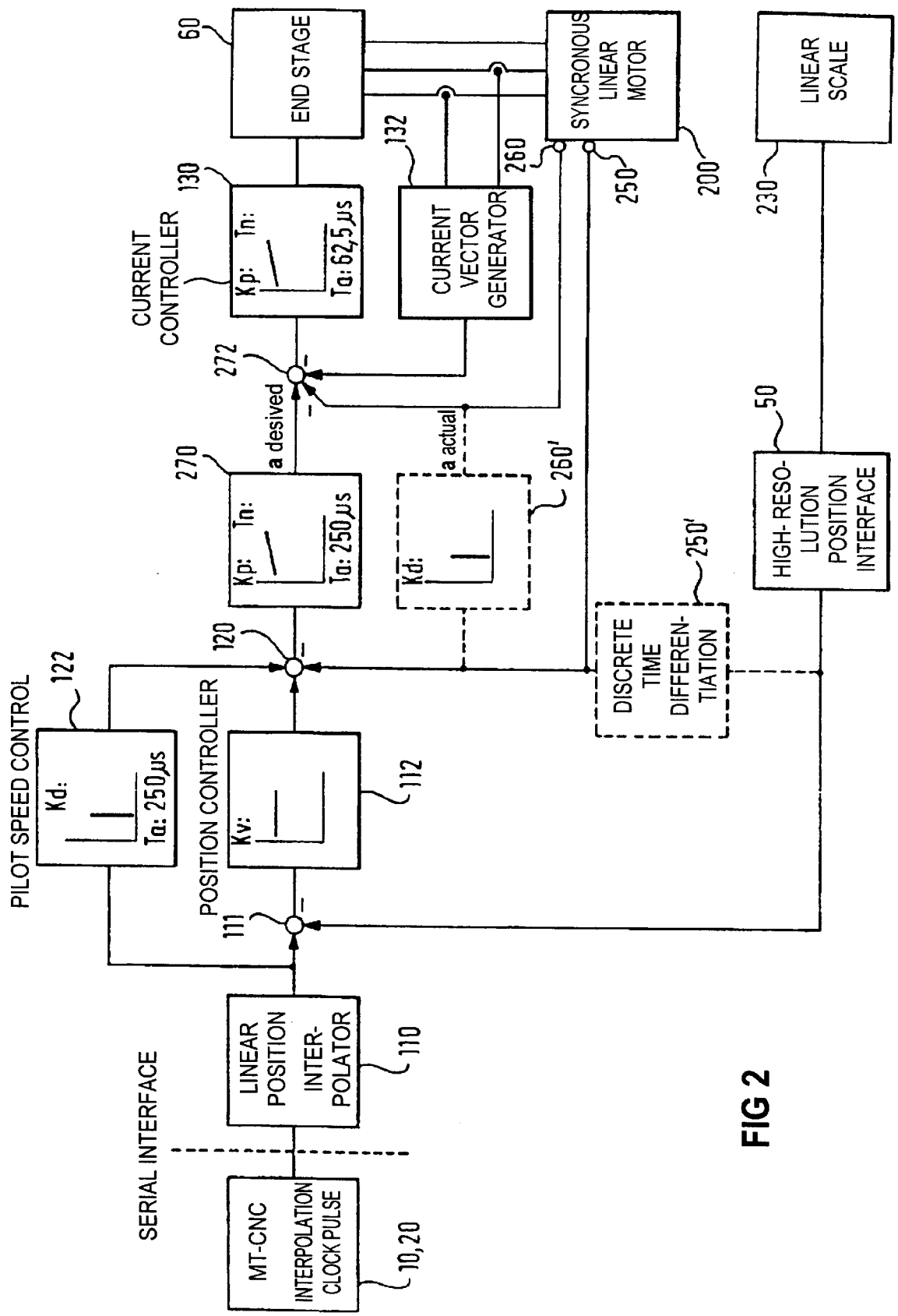
FIG. 2 shows a schematic illustration of a controller according to the invention.

FIG. 2 shows in more detail an example for the configuration of the motor control process executed in the computer 100.

The preset data are transmitted from the machine computer 10 and data carrier 20, respectively, to a linear position interpolator 110. These data are then united in a subtractor 111 which has an inverted input receiving the actual position data from the linear scale 230 via a high-resolution position interface 50. The difference signal is then supplied to a position controller 112 generating output data being supplied to a further subtractor 120. Conventionally, the speed difference is formed by differentiating the output signal of the position interface 50 in a differentiator 250' and then supplying the output signal to the subtractor 120. The subtractor is followed by a circuit for determination of the acceleration deviation, whereby the desired acceleration is determined in a circuit 270 and subtracted therefrom is the actual acceleration which is determined by a further differentiator 260'. A subsequent control part comprised of a current controller 130, an end stage 60 and a current vector generator 132 generates therefrom the drive current for the synchronous linear motor 200.

The illustrated control device thus represents a cascade control device which can include an additional speed pilot control 122 which supplies a speed pilot signal to the subtractor 120.

Since the information about the actual speed value and the actual acceleration value is determined by differentiators 250' and 260', the control system not only experiences mechanical effects, but also adverse effects due to signal delays, phases rotations, etc.

Therefore, the control process according to the invention differs from the control process described above by providing instead of the differentiator 250' an additional sensor 250 which is directly located on or inside the synchronous linear motor. This sensor 250 directly determines the speed of the primary part of the motor and supplies a corresponding signal to the subtractor 120.

The acceleration can also be measured directly by a separate acceleration sensor 260 which transmits the acceleration signal to the subtractor 272 without differentiation, so that the differentiator 260' can be eliminated. In accordance with the present invention, the differentiators 250', 260' are thus replaced by sensors 250, 260 for directly measuring the state of movement of the motor.

Figure 3:
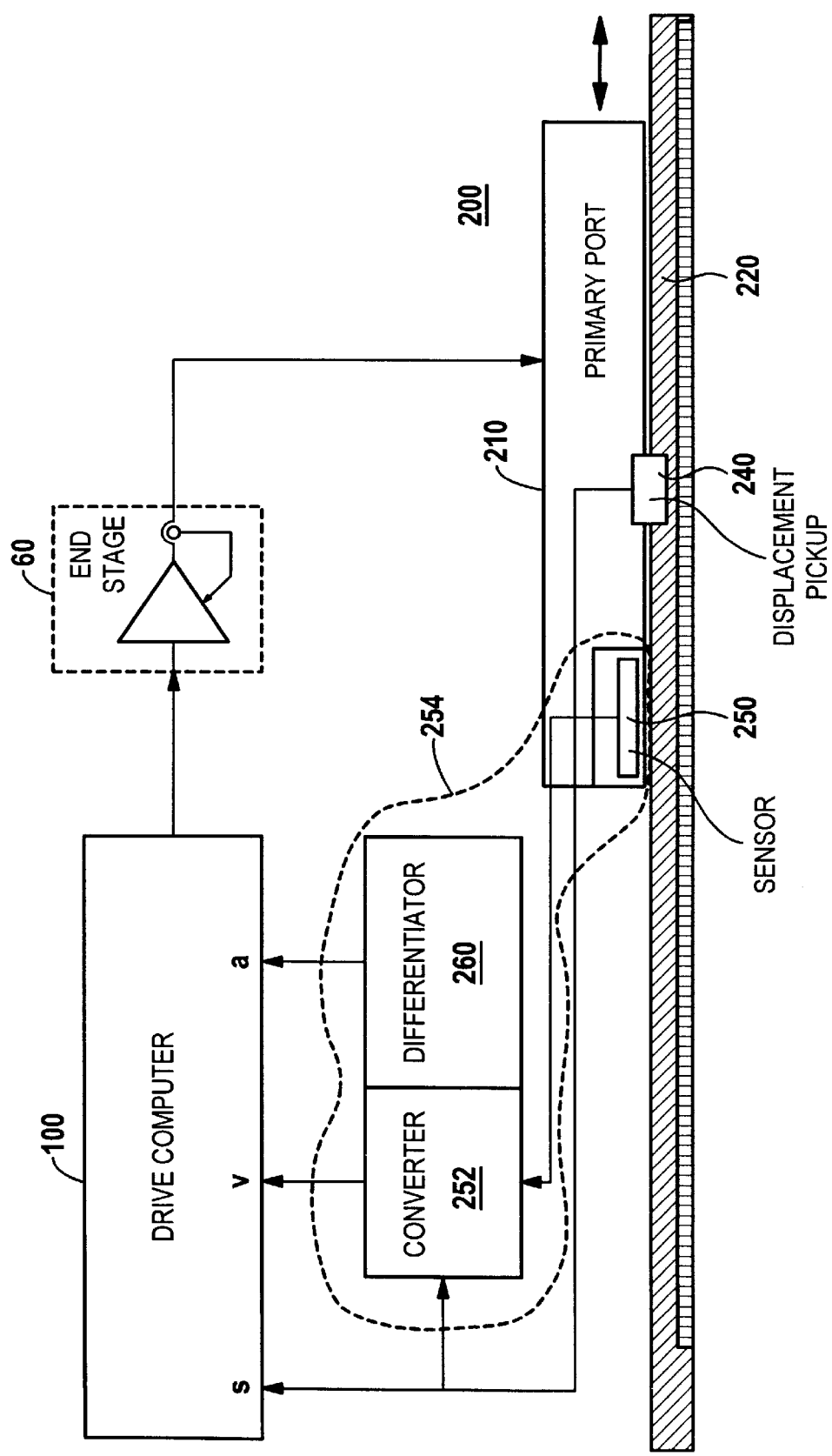
FIG. 3 shows another schematic illustration of a CNC-controlled machine tool with a linear motor.

An advantageous implementation of the principle according to the invention, is shown in the schematic illustration of FIG. 3. FIG. 3 essentially corresponds to FIG. 1, except that the various interfaces have been omitted.

In the exemplified embodiment of FIG. 3, the speed sensor 250 is a coil sensor located in proximity of the air gap of the linear motor 200 and adapted to determine the electromagnetic field in the air gap. Consequently, the sensor determines directly the electromagnetic field which forms the basis for the force transmission of the motor. Electric voltages are induced in the coil or coils of the sensor 250 which are proportional to the time change of the magnetic field and are therefore (assuming a stationary magnetic field) proportional to the speed. The (analog) signal of the coil sensor 250 is processed in a converter 252 by means of a signal processing method to be described later, to the drive computer 100 in the form of a speed signal v, possibly after quantization. Furthermore, a signal a that is proportional to the acceleration is derived from the speed-proportional signal of the coil sensor 250 via the afore described differentiator 260' and also supplied to the drive computer 100. The drive computer 100 controls the movement of the secondary part 210 of the linear motor 200 via the amplifier and the end stage 60, respectively.

The exemplified embodiment of FIG. 3 has the crucial advantage of directly transmitting a speed-proportional signal from the sensor 250. There is thus no need to derive from the discrete position signal another quantized speed signal.

Although this embodiment uses a differentiator 260' to measure the acceleration, this embodiment has also significant advantages with respect to acceleration control. On one hand, the acceleration is determined by a simple differentiation of the speed signal and not, like in the state of the art, by twice differentiating a position signal. On the other hand, the speed sensor 250 is located directly at the force interface so that the acceleration signal a that is derived from the speed signal corresponds directly to the difference in acceleration between the primary part 210 and the secondary part 220.

The dual measurement of acceleration, on the one hand on the primary part 220 and on the other hand on the secondary part 210, followed by computing the difference between these two values to determine the actual differential acceleration is thus not required.

In the exemplified embodiment of FIG. 3, the signal converter 252 described above is preferably provided to process the signal of the sensor 250, and its operation will be now described. The coil sensor 250 is located directly on the force interface of the motor 200, i.e. the coil sensor follows the same magnetic track as the primary part 210, with the sensor only registering its immediate local environment, i.e. the sensor 250 "sees" only in a very limited region. As a consequence of the design (alternating N and S magnetic poles in the primary part) and of manufacturing tolerances, the signal of sensor 250 which ideally is proportional only to the speed, may also vary with the sensing position s, i.e. it is v=f(s). If the motor is operated in practice at a constant speed, i.e. the primary part 210 is moved with a constant speed from one end of the secondary part 220 to the other end, then the measured speed signals v will vary as a function of the position s. The signal converter 252 compensates for this position dependence of the speed signal.

For this purpose, the signal of the speed sensor 250 is advantageously first rectified in the signal converter 252, whereas the signal from the displacement pickup 240 is also supplied to the speed converter. The speed data of sensor 250 and the position data of displacement pickup 240 are simultaneously measured and correlated with each other during a test run during which the primary part 210 is moved one or more times over the entire length of the secondary part 220 at a constant speed, so that the position dependence of the speed signal at a constant speed of the secondary section 210 can then be determined. A correction function v*(s) is then determined in a manner known in the art from the functional dependence v(s) of the speed signal on the position, and indicates how the signal of sensor 250 must be corrected in order to determine at a constant speed an identical speed signal for all locations. The value pairs $s_i$, $v^*_i$ at each location can then be stored, for example, in form of a reference table in the signal converter 252, so that the respective correction value $v^*_i$ for each position si can then be retrieved during the later control operation, and the signal of the speed sensor 250 can be corrected in an evaluation logic (not shown). Details relating to the design of the evaluation logic and realization of a reference table in the signal converter 252 by means of a memory are known to those skilled in the art and will therefore not be described in more detail. Instead of storing the correction function v*(s) as a reference table, it is basically also possible to generate the correction function v*(s) via a function generator which reproduces the function v*(s) very accurately, for example, via suitable trigonometric and similar functions.

Finally, it should also be noted that the signal converter 252, the differentiator 260' and the sensor 250 may also be combined into a single unit, as indicated in FIG. 3 by the dashed line 254. The unit 254 is then directly integrated into the primary part 210 of the motor 200, so that the only external connections of the motor 200 are those for the position signal s, the speed signal v and the acceleration signal a. Furthermore, it is also possible to determine the correction function not only during an initial test run, but also at time intervals, depending on the application of the motor. The correction function can be automatically updated, for example, at regular intervals or every time the motor is started, so that gradual changes, e.g. due to wear, can be taken into account.

What is claimed is:

1. A control device for a motor having at least two motor parts which interact with each other via a force transmission interface and are movable relative to each other, said control device comprising a sensor for determining a state of movement of the motor parts; and a controller for controlling the state of movement of the motor in response to signals of the sensor, said sensor being associated with the force transmission interface of the motor and determining at least one state parameter of the force transmission medium of the motor.

2. The control device of claim 1, wherein the sensor is arranged in the force transmission medium of the motor.

3. The control device of claim 1, wherein the force transmission medium of the motor is one of a fluid and an electromagnetic field.

4. The control device of claim 1, wherein the motor is a rotary motor, said sensor being at least one of an angular speed pickup and an angular acceleration pickup.

5. The control device of claim 1, wherein the motor is a linear motor, said sensor being at least of a speed pickup and an acceleration pickup.

6. The control device of claim 1, wherein the sensor determines an electromagnetic field or changes in an electromagnetic field upon which the force transmission of the motor is based.

7. The control device of claim 6, wherein the sensor is an induction sensor.

8. The control device of claim 7, wherein the sensor includes at least one coil.

9. The control device of claim 1, and further comprising a signal converter, and a displacement pickup, said signal converter being connected to the displacement pickup and the sensor for determining the state of movement, said signal converter including storage and correction means to compensate a possible dependence of a signal of the sensor on the position.

10. A process of controlling a motor of a type including at least two motor parts which interact with each other via a force transmission interface and are moveable relative to each other, said process comprising the step of registering a state of movement of the motor at the force transmission interface of the motor through determination of state parameters of a force transmission medium of the motor.

11. The process of claim 10, wherein said registering step includes determining at least one of a pressure of a fluid, a pressure change of a fluid, a strength of an electromagnetic field, and a change in the electromagnetic field, at the force transmission interface of the motor.

12. The process of claim 10, wherein said registering step includes at least one of determining an angular speed and an angular acceleration, at the force transmission interface.

13. The process of claim 10, wherein said registering step includes at least one of determining a linear speed and a linear acceleration, at the force transmission interface of the motor.

14. The process of claim 10, wherein a position control and a speed control are cascaded.

15. The process of claim 14, wherein the speed is controlled by a pilot control.

16. The process of claim 14, wherein a cascade control is implemented in conjunction with an acceleration control.

17. The process of claim 16, wherein the acceleration is controlled by a pilot control.

18. The process of claim 10, wherein the state of movement of the motor is registered with an induction sensor located at the force transmission interface and producing a signal which is proportional to the speed of the motor.

19. The process of claim 14 wherein the induction sensor is a sensor having one or more coils.

20. The process of claim 14, wherein the speed-proportional signal is supplied to a speed control, and the speed-proportional signal is supplied to an acceleration control after time-based differentiation.

21. The process of claim 18, and further comprising the steps of:

operating, before start-up of the motor, the motor during a test run at least once at a constant speed, and registering the speed-proportional signal as a function of the current position of the motor;

determining a correction function from the instantaneous speed-proportional signal and the signals relating to the current position; and correcting the signal of the sensor with the correction function as to compensate the dependence of the signal of the sensor from the position of the motor.

22. The process of claim 21, wherein the correction function is stored in the form of a reference table.

23. The process of claim 21, wherein the correction function is generated in the form of an approximation function.

* * * * *